US011574125B2

(12) United States Patent
Therani et al.

(10) Patent No.: US 11,574,125 B2
(45) Date of Patent: Feb. 7, 2023

(54) METHOD FOR AUTOMATICALLY DETERMINING TARGET ENTITIES FROM UNSTRUCTURED CONVERSATION USING NATURAL LANGUAGE UNDERSTANDING

(71) Applicant: Near Pte. Ltd., Singapore (SG)

(72) Inventors: Madhusudan Therani, San Jose, CA (US); Anil Mathews, Bangalore (IN)

(73) Assignee: NEAR INTELLIGENCE HOLDINGS, INC., Pasadena, CA (US)

( * ) Notice: Subject to any disclaimer, the term of this patent is extended or adjusted under 35 U.S.C. 154(b) by 246 days.

(21) Appl. No.: 17/039,752

(22) Filed: Sep. 30, 2020

(65) Prior Publication Data

US 2022/0100960 A1 Mar. 31, 2022

(51) Int. Cl.
*G06F 40/295* (2020.01)
*G06F 40/35* (2020.01)
*G06F 16/9032* (2019.01)

(52) U.S. Cl.
CPC ...... *G06F 40/295* (2020.01); *G06F 16/90332* (2019.01); *G06F 40/35* (2020.01)

(58) Field of Classification Search
CPC ... G06F 40/295; G06F 16/90332; G06F 40/35
See application file for complete search history.

(56) References Cited

U.S. PATENT DOCUMENTS

| | | | | |
|---|---|---|---|---|
| 2003/0088623 | A1* | 5/2003 | Kusuda | H04L 51/04 709/204 |
| 2004/0073520 | A1* | 4/2004 | Eskandari | G06Q 30/0283 705/400 |
| 2011/0178841 | A1* | 7/2011 | Rane | G06Q 30/0202 705/7.31 |
| 2016/0350280 | A1* | 12/2016 | Lavallee | G06F 40/30 |
| 2017/0148050 | A1* | 5/2017 | Montero | G06Q 10/063 |
| 2018/0165723 | A1* | 6/2018 | Wright | G06F 40/30 |

* cited by examiner

*Primary Examiner* — Sonia L Gay

(57) ABSTRACT

A system and method for automatically parsing an unstructured conversation to determine target entities for an engagement activity are provided. The method includes (i) obtaining the unstructured conversation associated with an asset using a dialogue manager, (ii) parsing the unstructured conversation using a natural language processing (NLP) model to obtain a target information associated with the asset, (iii) extracting attributes of one or more target entities from the target information using a Natural Language Understanding (NLU) model of domain of the unstructured conversation, (iv) generating, using the attributes of the one or more target entities, a definition of the cohort and at least one criteria for cohort curation for the asset by converting the unstructured conversation to a structured target information, and (v) determining a size of the one or more target entities based on the definition and the criteria for cohort curation for the asset for an engagement activity.

17 Claims, 12 Drawing Sheets

CREATE CARD

| CARD NAME | CARD DESCRIPTION |

| VISIT PERIOD | VISIT FREQUENCY | LOCATION RADIUS |

CLEAR  CREATE

METHOD FOR AUTOMATICALLY DETERMINING TARGET ENTITIES FROM UNSTRUCTURED CONVERSATION USING NATURAL LANGUAGE UNDERSTANDING

CROSS-REFERENCE TO RELATED APPLICATIONS

This patent application is related to pending U.S. non-provisional patent application Ser. No. 16/792,226 filed on Feb. 15, 2020, pending U.S. non-provisional patent application Ser. No. 16/792,231 filed on Feb. 15, 2020, and pending U.S. non-provisional patent application Ser. No. 16/792,236 filed on Feb. 15, 2020, the complete disclosures of which, in their entireties, are hereby incorporated by reference.

BACKGROUND

Technical Field

The present disclosure generally relates to the curation of target entities. More specifically, the present disclosure relates to a system and method for performing real-time parsing of one or more unstructured conversations that are associated with an asset using natural language understanding for curating target entities for an engagement activity or a campaign.

Description of the Related Art

According to an exemplary scenario, marketing campaigns play a crucial role in increasing awareness about a particular product, a service, a business, or an organization. Typically, the marketing campaigns comprise a marketing brief, which is a guideline for the marketing campaigns and lays a framework for marketing initiatives. Either of an internal marketing team or an external marketing team of the organization (for example) may collaborate to execute a strategy for the marketing brief. Upon choosing the external marketing team to collaborate on a marketing initiative, writing the marketing brief in detail may be essential. A conversation that occurs during the collaboration of both the internal marketing team and the external marketing team remains vague and unstructured. Further, an estimate of the marketing campaigns executed monthly may be as large as 5 to 10 million. On average, each external marketing team processes 5-10 briefs per day. After creating the marketing brief, a group of target entities that is curated that is suitable for the marketing brief, which is an essential step in a marketing lifecycle. Amounting to a massive volume of marketing briefs and a rapidly changing landscape of the entities, curating the target entities that meet the requirements of the product or the service becomes essential to have a successful marketing campaign.

Regardless of a sector, every organization today relies on large volumes of textual information. The processing of such large volumes of the textual information according to requirements of the marketing briefs constitutes a challenging task. Existing methodologies process structured data given by a media planner to generate the marketing briefs. Existing methodologies parse the marketing briefs manually to extract target entities and do not enable the generation of the marketing briefs for a large scale of the target entities in a very short time. The challenging task is further complicated as knowledge about semantics of conversation or discourse of communication associated with the product or the service varies across each domain.

Further, much of the data obtained in data streams is either partial or incorrect. The partial data refers to data exhaust or exhaust data, that includes a trail of data left by the activities of the internet or other computer system entities during at least one of online activity, online behavior, or transactions. The partial data may include data such as geospatial data, network data, and time-series data that may be useful for predictive purposes. Typically, an enormous amount of raw data is created by the data streams, such that the raw data may be in the form of cookies, temporary files, log files, storable choices, and the like. The most challenging aspect of working with the exhaust data could be getting a single holistic view around the exhaust data, and cleaning up and unifying the exhaust data could be a challenge. Hence, scaling and unification of such large and high-speed data streams is essential and requires to be done in real-time, as it is impossible to be done manually because of the sheer size of the data and also because the data may have a shelf-life.

Additionally, data points on human activity are typically scalable as the number of entities may use several devices. The devices may be a phone, a television, a personal computer. Each entity may use 1 to 10 mobile applications. Hence, a requirement for scaling could be essential. There may be a need to discard around a percentage of the data to support scaling. However, it is a challenging task due to less time available to make decisions and an increase in the flow of the data. The data may be contextually relevant for a short time.

Accordingly, there arises a need to address the aforementioned technical drawbacks in existing technologies for curating target entities.

SUMMARY

In view of the foregoing, an embodiment herein provides a processor-implemented method for automatically parsing an unstructured conversation using natural language processing to determine target entities for an engagement activity. The method includes the steps of (i) obtaining at least one unstructured conversation associated with an asset between one or more entities using a dialogue manager from one or more communication channels, (ii) parsing the at least one unstructured conversation associated with the asset using a natural language processing (NLP) model to obtain a target information associated with the asset, (iii) extracting the at least one attribute of one or more target entities from the target information associated with the asset using a natural language understanding (NLU) model of domain of the at least one unstructured conversation, (iv) generating, using the at least one attribute of the one or more target entities, a definition of a cohort and one or more criteria for cohort curation for the asset by converting the least one unstructured conversation into a structured target information, wherein the definition of the cohort includes the at least one attribute of the one or more target entities and (v) determining, a size and characteristics of the one or more target entities using the definition of the cohort and the one or more criteria for cohort curation for the asset for an engagement activity.

In some embodiments, the method further includes (i) testing, in real-time, the cohort by running a test engagement activity with at least one unique entity identifier associated with at least one target entity in the one or more target entities, and (ii) refining, in real-time, the one or more target entities of the cohort for the asset based on the test engagement activity and curating the one or more target entities for the engagement activity based on cohort response from the test engagement activity.

In some embodiments, the at least one attributes of the one or more target entities and the characteristics of the cohort based on the definition of the cohort include at least one of a countable attribute, a categorical attribute, an ordinal attribute, a location, a spatial attribute, or a temporal behavior of the one or more target entities. The cohort may include metadata of the cohort. The metadata may include data associated with the at least one of the categorical attribute, the spatial attribute, or the temporal behavior of the one or more target entities.

The countable attribute of the one or more target entities may include at least one of (i) spend levels, or (ii) a frequency of visits to a location. The categorical attribute may include at least one of (i) a gender, (ii) an age-group, (iii) a content, or (iv) a content type. The spatial attribute may include at least one of (i) residential areas, (ii) regions of interest, or (iii) place categories.

In some embodiments, the method further includes training the natural language understanding (NLU) model using at least one of a definition of the cohort data associated with the asset, or a domain information associated with the asset.

In some embodiments, the method further comprises determining, using a target audience estimator, the size of the one or more target entities based on the definition of the cohort.

In some embodiments, the method further includes determining, using a hypercube estimator, the size of the one or more target entities based on the definition of the cohort by (i) identifying a dimensional factor for each of one or more spatiotemporal dimensions of the one or more target entities by processing the at least one unique entity identifier and a timestamp data updated in a geolocation of a key value data structure, and (ii) determining the size of the one or more target entities based on the definition of the cohort, the dimensional factor and a base cardinality of each or combinations of the one or more spatiotemporal dimensions.

In some embodiments, the one or more spatiotemporal dimensions include a location, individual attributes, a time window or activity, or a combination thereof.

In some embodiments, the method further includes automatically generating a response for the engagement activity based on the at least one unstructured conversation associated with the asset.

In another aspect, there is provided one or more non-transitory computer-readable storage medium that stores one or more sequence of instructions for automatically parsing an unstructured conversation using natural language processing to determine target entities for an engagement activity, which when executed by a processor cause the steps of (i) obtaining at least one unstructured conversation associated with an asset between one or more entities using a dialogue manager from one or more communication channels, (ii) parsing the at least one unstructured conversation associated with the asset using a natural language processing (NLP) model to obtain a target information associated with the asset, (iii) extracting at least one attribute of one or more target entities from the target information associated with the asset using a natural language understanding (NLU) model of domain of the at least one unstructured conversation, (iv) generating, using the at least one attribute of the one or more target entities, a definition of a cohort and one or more criteria for cohort curation for the asset by converting the least one unstructured conversation into a structured target information, wherein the definition of the cohort includes the at least one attribute of the one or more target entities and (v) determining, a size and characteristics of the one or more target entities using the definition of the cohort and the one or more criteria for cohort curation for the asset for an engagement activity.

In yet another aspect, there is provided a system for automatically parsing an unstructured conversation using natural language processing to determine target entities for an engagement activity. The system includes a processor and a memory that stores set of instructions, which when executed by the processor, causes to perform the steps of (i) obtaining at least one unstructured conversation associated with an asset between one or more entities using a dialogue manager from one or more communication channels, (ii) parsing the at least one unstructured conversation associated with the asset using a natural language processing (NLP) model to obtain a target information associated with the asset, (iii) extracting at least one attribute of one or more target entities from the target information associated with the asset using a natural language understanding (NLU) model of domain of the at least one unstructured conversation, (iv) generating, using the at least one attribute of the one or more target entities, a definition of a cohort and one or more criteria for cohort curation for the asset by converting the least one unstructured conversation into a structured target information, wherein the definition of the cohort includes the at least one attribute of the one or more target entities and (v) determining, a size and characteristics of the one or more target entities using the definition of the cohort and the one or more criteria for cohort curation for the asset for an engagement activity.

In some embodiments, the processor further (i) tests, in real-time, the cohort by running a test engagement activity with at least one unique entity identifier associated with at least one target entity in the one or more target entities, and (ii) refines, in real-time, the one or more target entities of the cohort for the asset based on the test engagement activity and curating the one or more target entities for the engagement activity based on cohort response from the test engagement activity.

In some embodiments, the at least one attributes of the one or more target entities and the characteristics of the cohort based on the definition of the cohort include at least one of a countable attribute, a categorical attribute, an ordinal attribute, a location, a spatial attribute, or a temporal behavior of the one or more target entities. The cohort may include metadata of the cohort. The metadata may include data associated with the at least one of the categorical attribute, the spatial attribute, or the temporal behavior of the one or more target entities.

The countable attribute of the one or more target entities may include at least one of (i) spend levels, or (ii) a frequency of visits to a location. The categorical attribute may include at least one of (i) a gender, (ii) an age-group, (iii) a content, or (iv) a content type. The spatial attribute may include at least one of (i) residential areas, (ii) regions of interest, or (iii) place categories.

In some embodiments, the processor further trains the natural language understanding (NLU) model using at least one of a definition of the cohort data associated with the asset, or a domain information associated with the asset.

In some embodiments, the processor further determines, using a target audience estimator, the size of the one or more target entities based on the definition of the cohort.

In some embodiments, the processor further determines, using a hypercube estimator, the size of the one or more target entities based on the definition of the cohort by (i) identifying a dimensional factor for each of one or more spatiotemporal dimensions of the one or more target entities by processing the at least one unique entity identifier and a timestamp data updated in a geolocation of a key value data structure, and (ii) determining the size of the one or more target entities based on the definition of the cohort, the dimensional factor and a base cardinality of each or combinations of the one or more spatiotemporal dimensions.

In some embodiments, the one or more spatiotemporal dimensions include a location, individual attributes, a time window or activity, or a combination thereof.

In some embodiments, the processor further automatically generates a response for the engagement activity based on the at least one unstructured conversation associated with the asset.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 7A to 7G illustrate example user interface views of a web-based entity curation system, according to some embodiments herein.

DETAILED DESCRIPTION OF PREFERRED EMBODIMENTS

Figure 1:
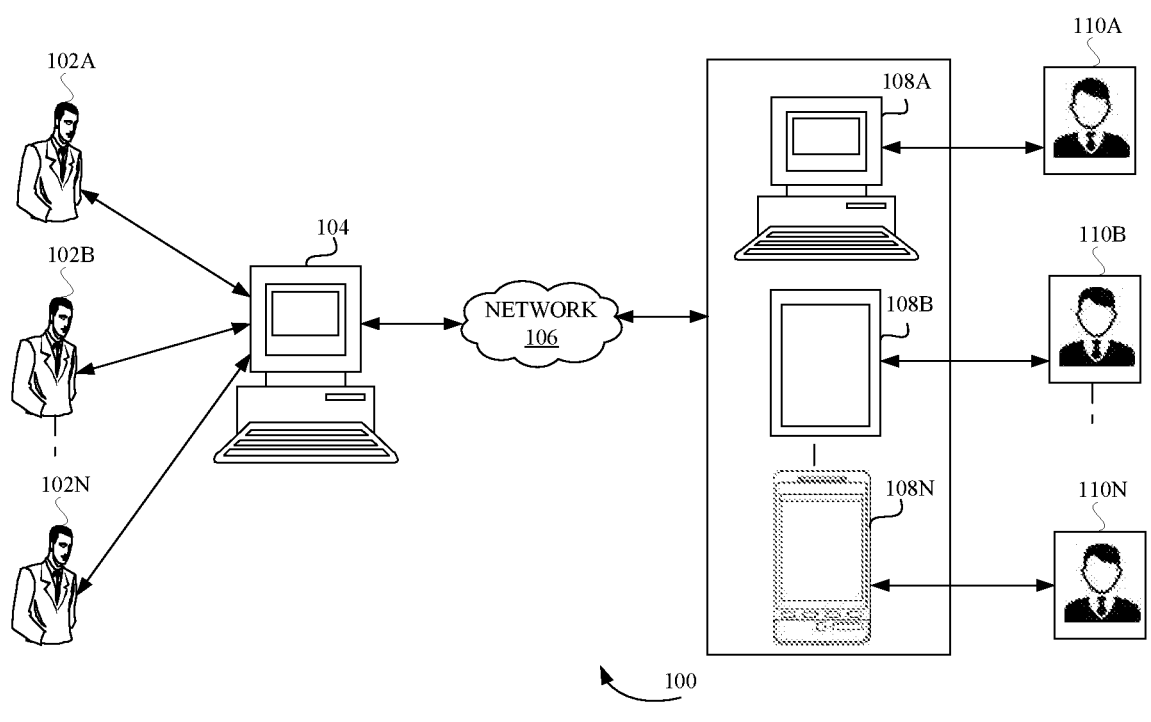
FIG. 1 illustrates a system for automatically determining one or more target entities from an unstructured conversation using natural language processing, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for automatically determining one or more target entities from an unstructured conversation using natural language understanding. As used herein the term "natural language understanding" (NLU) refers to a branch of natural language processing (NLP), that helps computers to understand and interpret human language by breaking down the elemental pieces of speech. While speech recognition captures spoken language in real-time, transcribes it, and returns text, the NLU goes beyond recognition to determine a user's intent in a given context. Speech or Text recognition is powered by statistical machine learning methods that add numeric structure to large datasets. In NLU, machine learning models improve over time as they learn to recognize syntax, context, language patterns, unique definitions, sentiment, and intent. Referring now to the drawings, and more particularly to FIGS. 1 to 8, where similar reference characters denote corresponding features consistently throughout the figures, there are shown preferred embodiments.

FIG. 1 illustrates a system 100 for automatically determining one or more target entities 110A-N from an unstructured conversation using natural language understanding, according to some embodiments herein. The system 100 includes one or more entities 102A-N, an entity curation system 104, a network 106, one or more communication channels 108A-N, and one or more target entities 110A-N. The one or more entities 102A-N may include entities that may perform unstructured communication associated with an asset. The one or more entities 102A-N may be media planners. The asset may include, but not limited to, a physical product, a digital product, a physical service, or a digital service. The one or more entities 102A-N may communicate a marketing brief associated with an asset. The one or more entities 102A-N may communicate with the entity curation system 104 via the one or more communication channels 108A-N using the unstructured conversation that may be associated with the asset.

The entity curation system 104 acquires at least one unstructured conversation associated with the asset between the one or more entities 102A-N using a dialogue manager. In one embodiment, the at least one unstructured conversation may be any kind of communication between the one or more entities 102A-N. The entity curation system 104 may obtain the unstructured communication through the one or more communication channels 108A-N. In one embodiment, the one or more communication channels 108A-N include, but is not limited to, a mobile device, a smart phone, a personal digital assistant (PDA), a notebook, a Global Positioning System (GPS) device, or any network enabled device. In one embodiment, the at least one unstructured conversation may be a chain of email conversation, or a dialogue conversation through online chat, or both.

The entity curation system 104 parses the at least one unstructured conversation using natural language processing (NLP) model to obtain a target information associated with the asset. The entity curation system 104 may consolidate one or more unstructured conversation associated with the asset between the one or more entities 102A-N through the one or more communication channels 108A-N. The entity curation system 104 extracts at least one attributes of the one or more target entities 110A-N from the target information associated with the asset using a natural language understanding (NLU) model of domain of the at least one unstructured conversation. In some embodiments, the entity curation system 104 queues the one or more unstructured conversation associated with the asset in an order in which the unstructured conversation is obtained. In some embodiments, the queues of the one or more unstructured conversation may be viewed manually on a user interface associated with the one or more entities 102A-N. The entity curation system 104 generates, using the at least one attributes of the one or more target entities 110A-N, a definition of a cohort and at least one criteria for curation of said cohort for the asset by converting the at least one unstructured conversation into a structured target information. The cohort may include one or more target entities 110A-N that may be determined by the definition of the cohort or one or more characteristics of the cohort. In some embodiments, the definition of the cohort includes the at least one attribute of the one or more target entities 110A-N.

The entity curation system 104 determines a size of the one or more target entities 110A-N and characteristics of the one or more target entities 110A-N based on the definition of the cohort for the asset. In some embodiments, the size of the one or more target entities 110A-N is determined using a target audience estimator or a hypercube estimator. The at least one unique entity identifier may be associated with the target audience estimator or the hypercube estimator to uniquely identify a target entity.

The hypercube estimator may determine the size of the one or more target entities 110A-N by (i) identifying a dimensional factor for one or more spatiotemporal attributes of the one or more target entities 110A-N by processing at least one unique entity identifiers and a timestamp data updated in a geo location of a key value data structure and (ii) determining the size of the one or more target entities 110A-N based on the definition of the cohort, the dimensional factor and a base cardinality of each or combinations of the one or more spatiotemporal dimensions. The at least one unique entity identifier may be associated with a target audience estimator or a hypercube estimator. The one or more spatiotemporal dimensions include a location, individual attributes, a time window or activity or a combination thereof.

In some embodiments, the at least one attributes of the one or more target entities 110A-N and the characteristics of the cohort based on the definition of the cohort include at least one of a countable attribute, a categorical attribute, an ordinal attribute, a location, a spatial attribute, or a temporal behavior of the one or more target entities 110A-N. The cohort may include metadata of the cohort. The metadata may include data associated with the at least one of the categorical attribute, the spatial attribute, or the temporal behavior of the one or more target entities 110A-N.

The countable attribute of the one or more target entities 110A-N may include at least one of (i) spend levels, or (ii) a frequency of visits to a location. The categorical attribute may include at least one of (i) a gender, (ii) an age-group, (iii) a content, or (iv) a content type. The spatial attribute may include at least one of (i) residential areas, (ii) regions of interest, or (iii) place categories.

In one exemplary embodiment, the entity curation system 104 is embedded in a traffic estimation system for estimating traffic on road networks. In another exemplary embodiment, the entity curation system 104 is embedded in a population diffusion estimation system for estimating population diffusion in an area after an event. In yet another exemplary embodiment, the entity curation system 104 is embedded in an entity detector for estimating the number of physical stores in different areas by product category.

The entity curation system 104 tests the cohort in real-time based on the cohort by running a test engagement activity with at least one unique entity identifier associated with at least one target entity in the one or more target entities 110A-N. The entity curation system 104 refines the one or more target entities 110A-N in real time for the asset based on the test engagement activity.

The entity curation system 104 may generate a response for the engagement activity based on the at least one unstructured conversation associated with the asset. In one embodiment, the response may be different across the one or more target entities 110A-N associated with the asset. In some embodiments, the response is viewed through a web-link shared with the one or more entities 102A-N. In some embodiments, the response may include one or more attributes of the one or more target entities 110A-N and the characteristics of the one or more target entities 110A-N based on the definition of the cohort.

Figure 2:
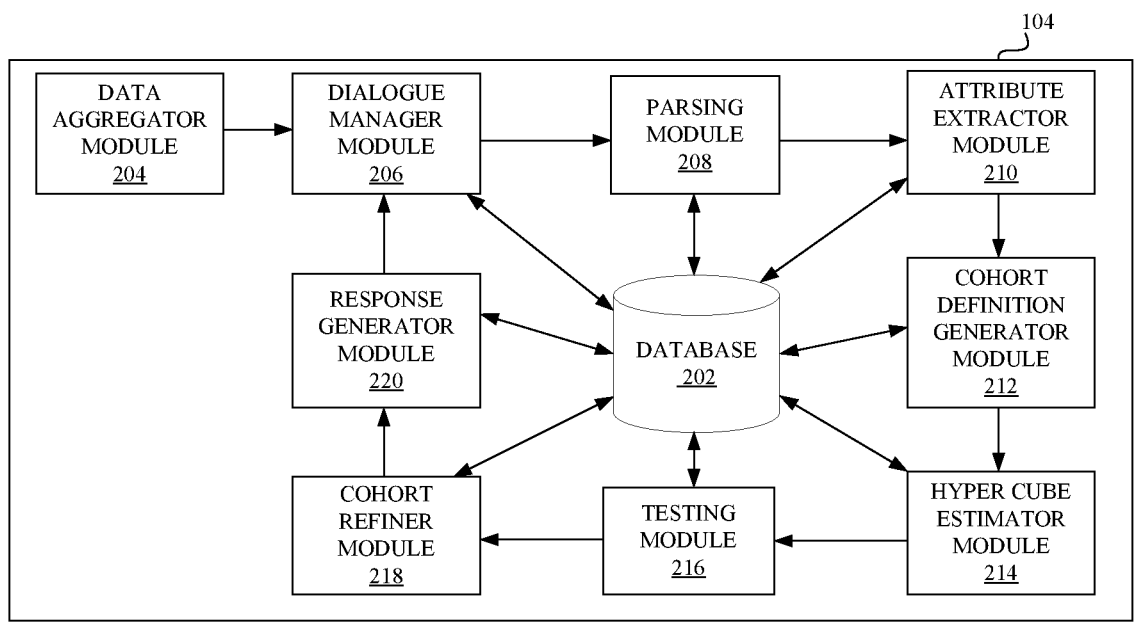
FIG. 2 illustrates an exploded view of an entity curation system of FIG. 1, according to some embodiments herein.

FIG. 2 illustrates an exploded view of an entity curation system 104 of FIG. 1 according to some embodiments herein. The entity curation system 104 includes a database 202, a data aggregator module 204, a dialogue manager module 206, a parsing module 208, an attribute extractor module 210, a cohort definition generator module 212, a hypercube estimator module 214, a testing module 216, a cohort refiner module 218, and a response generator module 220. The data aggregator module 204 acquires the at least one unstructured conversation associated with the asset between the one or more entities 102A-N. In one embodiment, the at least one unstructured conversation may be any kind of communication between the one or more entities 102A-N. The entity curation system 104 may obtain the at least one unstructured conversation through the one or more communication channels 108A-N. In one embodiment, the one or more communication channels 108A-N are engaged with (i) one or more applications, (ii) a wireless network, or (iii) a mobile network. The dialogue manager module 206 manages the at least one unstructured conversation associated with the asset between one or more entities 110A-N. The parsing module 208 parses the at least one unstructured conversation using the Natural Language Processing (NLP) to obtain the target information through the one or more communication channels 108A-N associated with the asset.

The attribute extractor module 210 extracts the at least one attribute of the one or more target entities 110A-N from the target information associated with the asset using the natural language understanding (NLU) model. In one embodiment, the NLU model includes sentiment analysis, dialogue agents, summarization, semantic parsing, paraphrase and natural language inference, and question and answering.

The cohort definition generator module 212 generates the definition of the cohort and the one or more criteria for cohort curation for the asset using the at least one attribute of the one or more target entities 110A-N from the target information associated with the asset. In some embodiments, the definition of the cohort includes the at least one attribute of the one or more target entities 110A-N.

The hypercube estimator module 214 determines a size of the one or more target entities 110A-N and characteristics of the one or more target entities 110A-N based on the definition of the cohort for the asset and the at least one criteria for the asset. In some embodiments, the characteristics of the one or more target entities 110A-N include at least one attribute of the one or more target entities 110A-N. The size of the one or more target entities 110A-N, using the hypercube estimator module 214, is determined by (i) identifying the dimensional factor for each of the one or more spatiotemporal dimensions of the one or more target entities 110A-N by processing the at least one unique entity identifier and a timestamp data updated in a geolocation of a key value data structure, and (ii) determining the size of the one or more target entities 110A-N based on the definition of the cohort, the dimensional factor and a base cardinality of each or combinations of the one or more spatiotemporal dimensions.

The testing module 216 tests the one or more target entities 110A-N in real-time based on the definition of the cohort by running the test engagement activity with the at least one unique entity identifier in the one or more target entities 110A-N.

The cohort refiner module 218 refines the one or more target entities 110A-N in real-time for the asset based on the test engagement activity. The response generator module 220 generates the response for the test engagement activity associated with the asset to the one or more target entities 110A-N associated with the asset based on the refined one or more target entities 110A-N. In some embodiments, the response is transmitted to the one or more target entities 110A-N based on the refined one or more target entities 110A-N using the dialogue manager module 206. In some embodiments, the response is viewed through the web-link shared to the one or more target entities 110A-N. In some embodiments, the response may include analytics related to the one or more target entities 110A-N.

Information from the at least one unstructured conversation may be stored in a hypercube that is spatially partitioned with geo hashes in terms of a key value data structure for one or more geo locations. In one embodiment, the hypercube includes heterogeneous collection of geo hashes. The hypercube may include a combination of geo hashes at granularity. In one embodiment, the key value data structure is a HyperLogLog (HLL) data structure. The key value data structure may be maintained temporally on per day basis, per hour basis, or in a rolling 30-day window. In an exemplary embodiment, a country is represented by 1×10^6 HLLs in the key value data structure that maintain a million keys for every day (similar for every 4-hour window). For a 30-day period, the key value data structure maintains 30 million keys.

Figure 3:
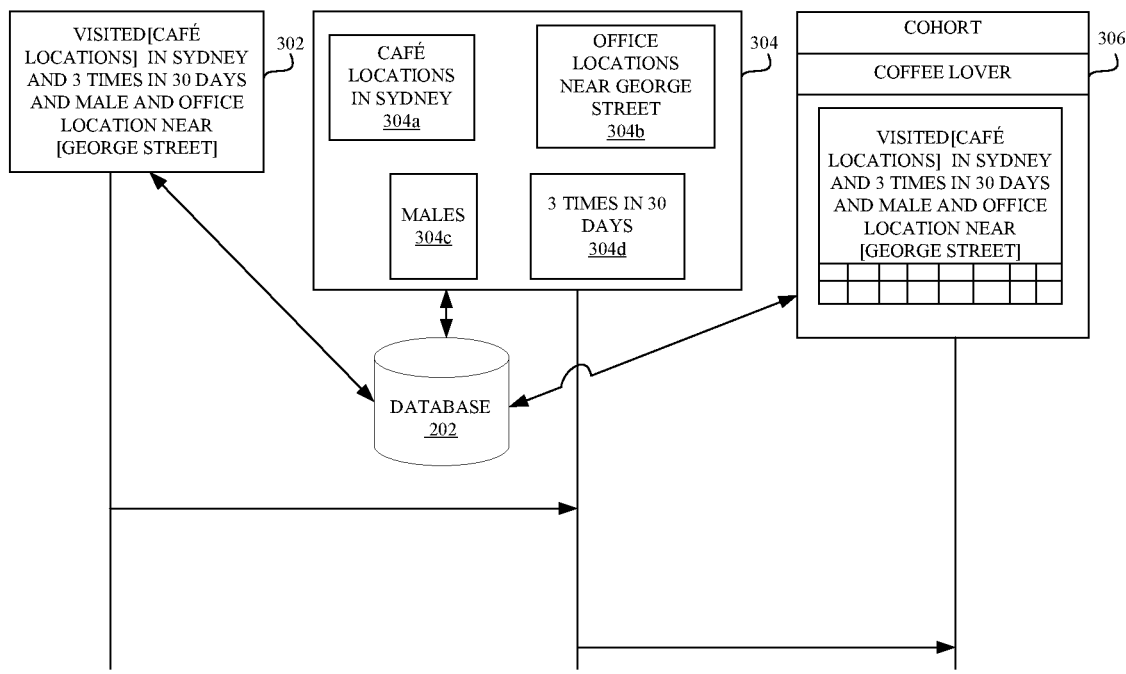
FIG. 3 illustrates an example use case of a cohort generation, according to some embodiments herein.

FIG. 3, with reference to FIGS. 1 and 2, depicts an example use case of a cohort generation, according to some embodiments herein. A data associated with the one or more target entities 110A-N is stored under each data table of attribute of the one or more target entities 110A-N. The database 202 facilitates a reverse search. The database 202 includes one or more rules for generating a cohort. The rule defining the cohort includes data such as, "an audience of coffee lovers in Sydney", that may describe individual entities associated with the at least one entity identifier who have visited café locations and are defined by specific sets of latitude and longitude pairs. For example, the one or more rules for generating the cohort may include "3 times in the last 30 days and are male and have office locations near George Street in Sydney".

The entity curation system 104 may parse the at least one unstructured conversation using the natural language understanding (NLU) model and a query is generated. An example query 302 that includes, "visited café locations in Sydney 3 times in 30 days and Males and office locations near George Street". The entity curation system 104 may receive and may match the one or more rules defining the cohort in the database 202. One or more attributes 304 of the one or more target entities 110A-N are extracted based on the query. One or more attributes 304 include for example, "café locations in Sydney" 304a, "males" 304b, "office locations near George Street" 304c, and "3 times in 30 days" 304d. Data pertaining to the males who visited café locations is retrieved from a gender data table. Data pertaining to the café locations in Sydney and whose have office locations are near George Street is retrieved from a location data table. Data pertaining to a duration and frequency of visits are retrieved from a time and count data table. The data is unified with a unique entity id related to the query and the definition of the cohort is generated as "Coffee Lover, visited [café locations] in Sydney and 3 times in 30 days and male and office location near [George street]" as depicted in block 306.

Figure 4:
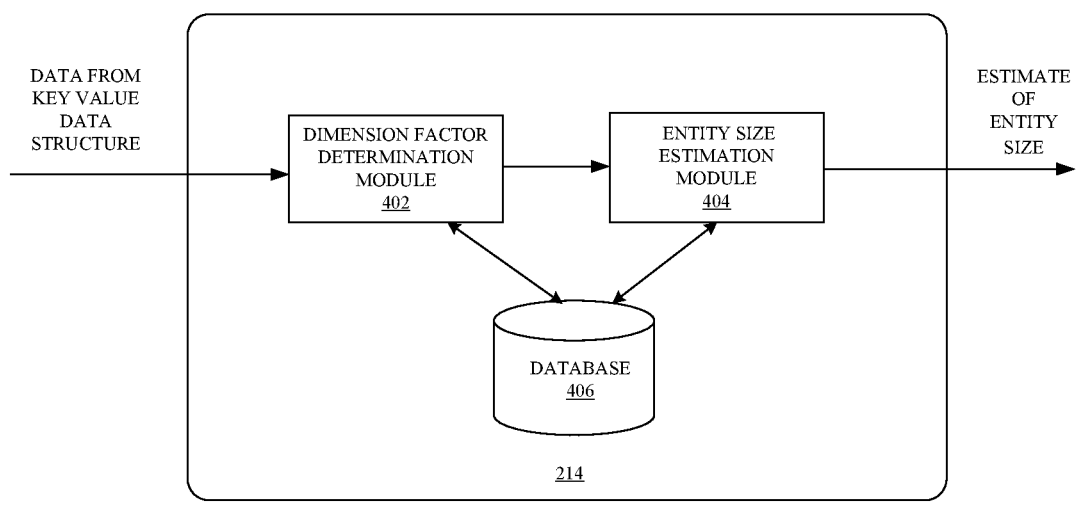
FIG. 4 illustrates an exploded view of a hypercube estimator module of the entity curation system of FIG. 2, according to some embodiments herein.

FIG. 4 illustrates an exploded view of a hypercube estimator module 214 of the entity curation system 104 of FIG. 2, according to some embodiments herein. The hypercube estimator 214 includes a dimension factor determination module 402, an entity size estimation module 404, and a database 406. The dimension factor determination module 402 determines the dimensional factor for each of the one or more spatiotemporal dimensions by processing a number of unique entity identifiers and the time stamp data stored in the key value data structure according to each dimension. The entity size estimation module 404 determines the size of the one or more target entities 110A-N for each or combinations of the one or more spatiotemporal dimensions based on the dimensional factor. The database 406 stores a machine learning based a time series model. The hyper cube estimator 214 estimates the size of the one or more target entities 110A-N based on the one or more spatiotemporal dimensions from the key value data structure.

Figure 5:
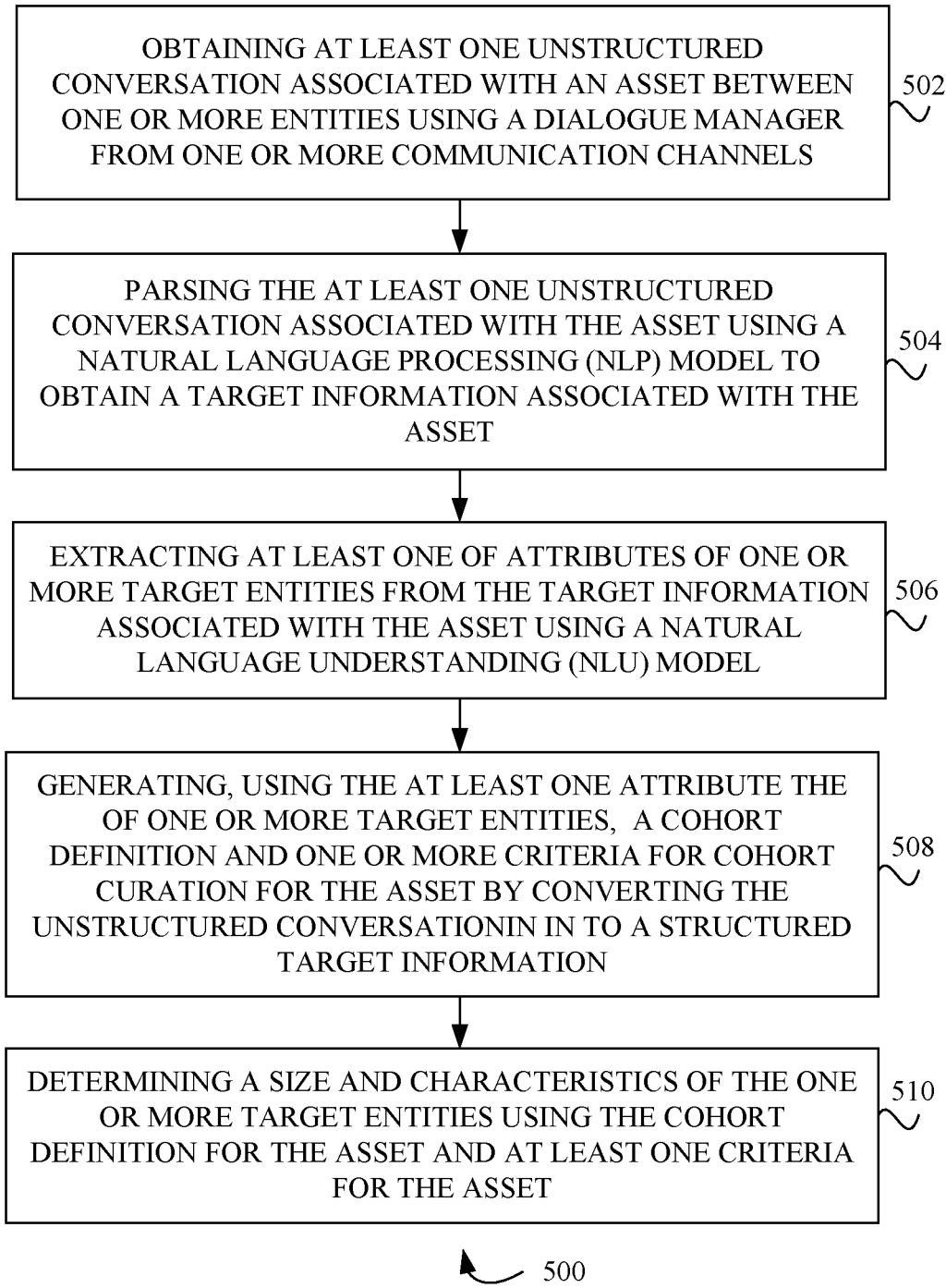
FIG. 5 is a flow diagram of a method for automatically determining one or more target entities from an unstructured conversation using natural language processing, according to some embodiments herein.

FIG. 5, with reference to FIGS. 1 through 4, is a flow diagram of a method 500 that automatically determines one or more target entities 110A-N from an unstructured conversation using natural language understanding, according to some embodiments herein. At a step 502, the at least one unstructured conversation associated with the asset between the one or more entities 102A-N is obtained using a dialogue manager from the one or more communication channels 108A-N. At a step 504, the at least one unstructured conversation associated with the asset is parsed using the natural language processing (NLP) model to obtain the target information associated with the asset. At a step 506, the at least one attribute of the one or more target entities 110A-N is extracted from the target information associated with the asset using the natural language understanding (NLU) model of domain of the at least one unstructured conversation. At a step 508, the definition of the cohort and the one or more criteria for cohort curation for the asset is generated, using the at least one attribute of the one or more target entities 110A-N, by converting the at least one unstructured conversation into the structured target information. The definition of the cohort includes the at least one attribute of the one or more target entities 110A-N. At a step 510, the size and characteristics of the one or more target entities 110A-N are determined using the definition of the cohort and the one or more criteria for cohort curation for the asset for the engagement activity.

In some embodiments, the method 500 further includes (i) testing, in real-time, the cohort by running a test engagement activity with at least one unique entity identifier associated with at least one target entity in the one or more target entities 110A-N, and (ii) refining, in real-time, the one or more target entities 110A-N of the cohort for the asset based on the test engagement activity and curating the one or more target entities 110A-N for the engagement activity based on cohort response from the test engagement activity.

In some embodiments, the method 500 further includes training the natural language understanding (NLU) model using at least one of a definition of the cohort data associated with the asset, or a domain information associated with the asset.

In some embodiments, the method 500 further comprises determining, using a target audience estimator, the size of the one or more target entities 110A-N based on the definition of the cohort.

In some embodiments, the method 500 further includes determining, using a hypercube estimator, the size of the one or more target entities 110A-N based on the definition of the cohort by (i) identifying a dimensional factor for each of one or more spatiotemporal dimensions of the one or more target entities 110A-N by processing the at least one unique entity identifier and a timestamp data updated in a geolocation of a key value data structure, and (ii) determining the size of the one or more target entities 110A-N based on the definition of the cohort, the dimensional factor and a base cardinality of each or combinations of the one or more spatiotemporal dimensions.

In some embodiments, the method 500 further includes automatically generating a response for the engagement activity based on the at least one unstructured conversation associated with the asset.

Figure 6:
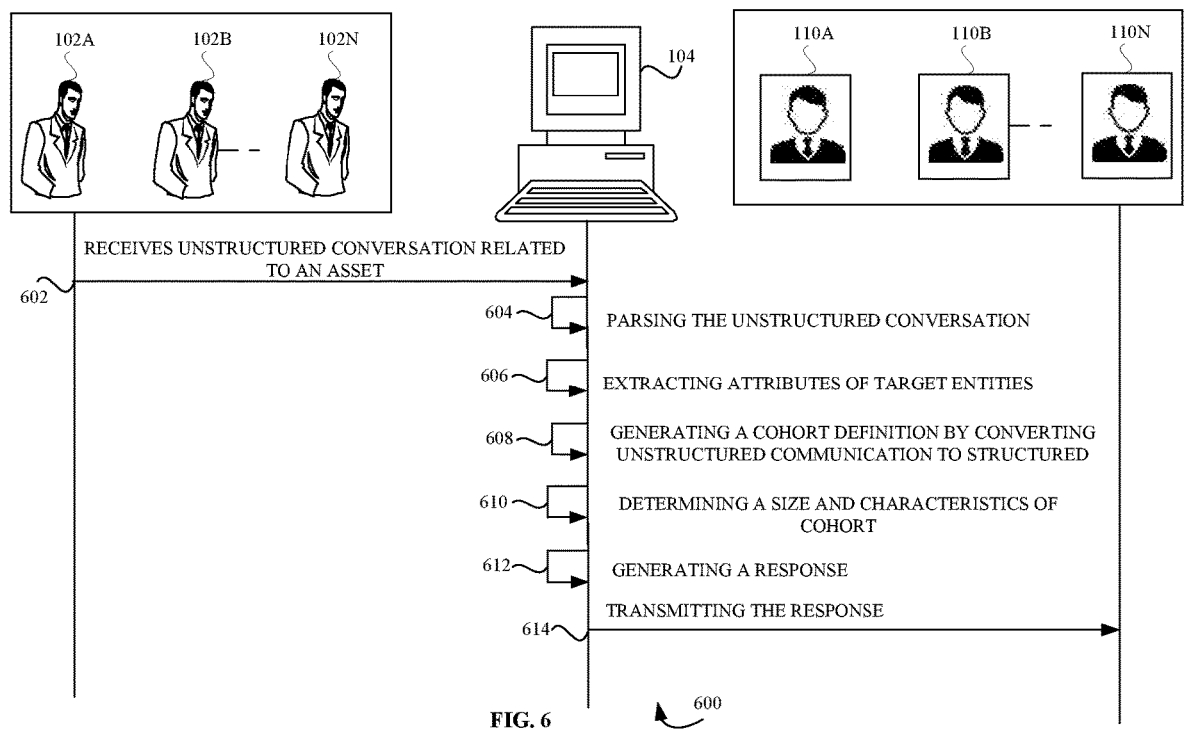
FIG. 6 is an interaction diagram of a method for automatically determining one or more target entities from an unstructured conversation using natural language processing, according to some embodiments herein.

FIG. 6, with reference to FIGS. 1 through 4, is an interaction diagram 600 of a method for automatically determining target entities from unstructured conversation using natural language understanding, according to some embodiments herein. At a step 602, the at least one unstructured conversation associated with an asset between the one or more entities 102A-N is obtained using a dialogue manager from the one or more communication channels 108A-N. At a step 604, the at least one unstructured conversation associated with the asset is parsed using the natural language processing (NLP) model to obtain the target information associated with the asset. At a step 606, the at least one attribute of one or more target entities 110A-N is extracted from the target information associated with the asset using the natural language understanding (NLU) model of domain of the at least one unstructured conversation. At a step 608, the definition of the cohort and the one or more criteria for cohort curation for the asset is generated, using the at least one attributes of the one or more target entities 110A-N, by converting the at least one unstructured conversation into the structured target information. The definition of the cohort includes the at least one attribute of the one or more target entities 110A-N. At a step 610, the size and characteristics of the one or more target entities 110A-N are determined using the definition of the cohort and the one or more criteria for cohort curation for the asset for the engagement activity. At step 612, a response is generated for the engagement activity based on the at least one unstructured conversation associated with the asset. At step 614, the generated response is transmitted to the one or more target entities 110A-N.

Figure 7A:
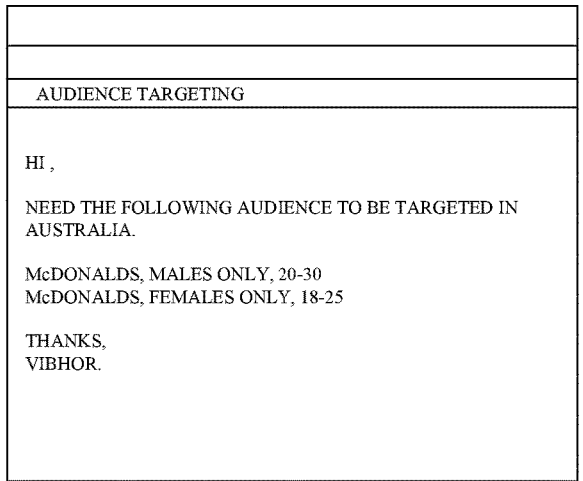
Figure 7B:
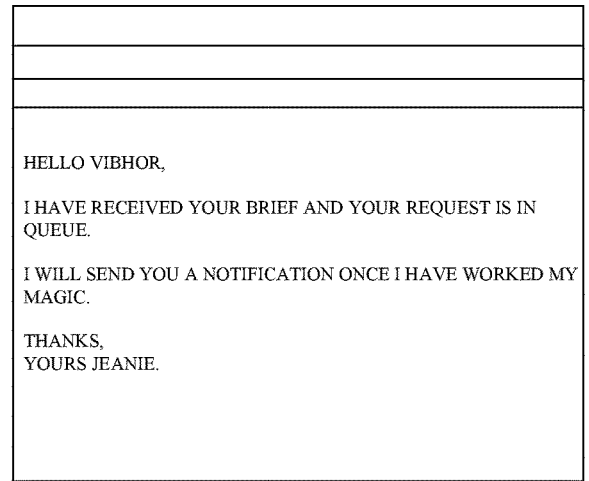
Figure 7C:
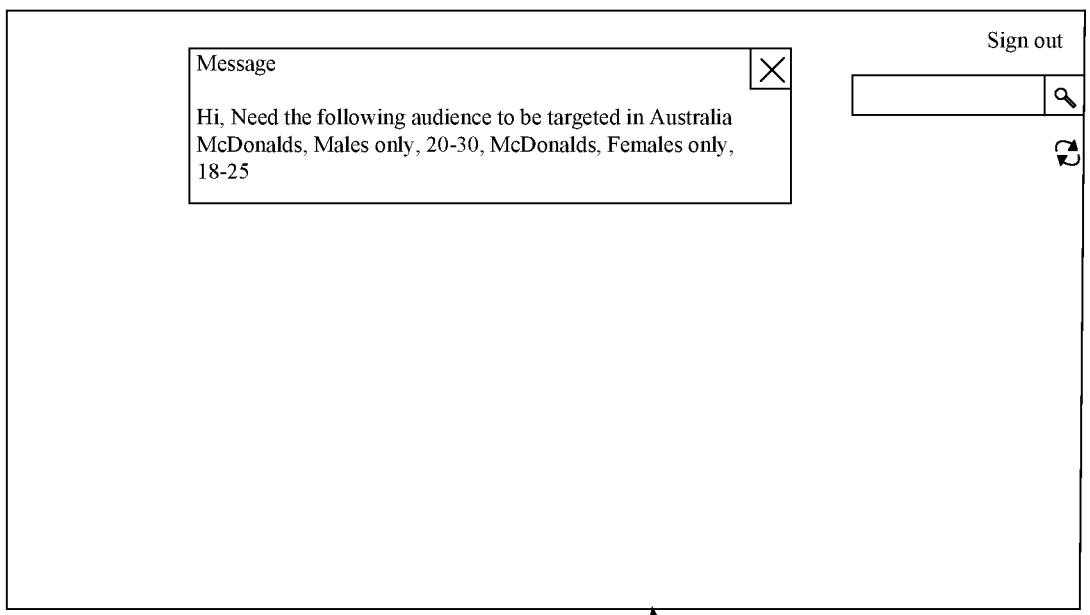

FIG. 7A-FIG. 7G, with reference to FIGS. 1 through 4, illustrate example user interface views of a web-based entity curation system, according to some embodiments herein. In FIG. 7A, 700A illustrates an exemplary representation of communication through an e-mail sent by the one or more entities 102A-N to the entity curation system 104. In 700A, the email includes the unstructured conversation associated with the asset. The unstructured conversation associated with the asset includes one or more attributes of the one or more target entities 110A-N. In 700A, the one or more attributes may be "males", "females", "McDonalds", "20-30", "18-25", "Australia". In FIG. 7B, 700B illustrates an exemplary representation of communication through an e-mail sent by the entity curation system 104 to the one or more entities 102A-N. In FIG. 7C, 700C represents a user interface which displays a message once the entity curation system 104 receives a communication from the one or more entities 102A-N about the asset using a dialogue manager from the one or more communication channels 108A-N. The message includes a rule defining the cohort of the asset using one or more attributes of the one or more target entities 110A-N. In 700C, the message is shown as "Need the following audience to be targeted in Australia McDonalds, Males only, 20-30, Females only, 18-25".

Figure 7D:
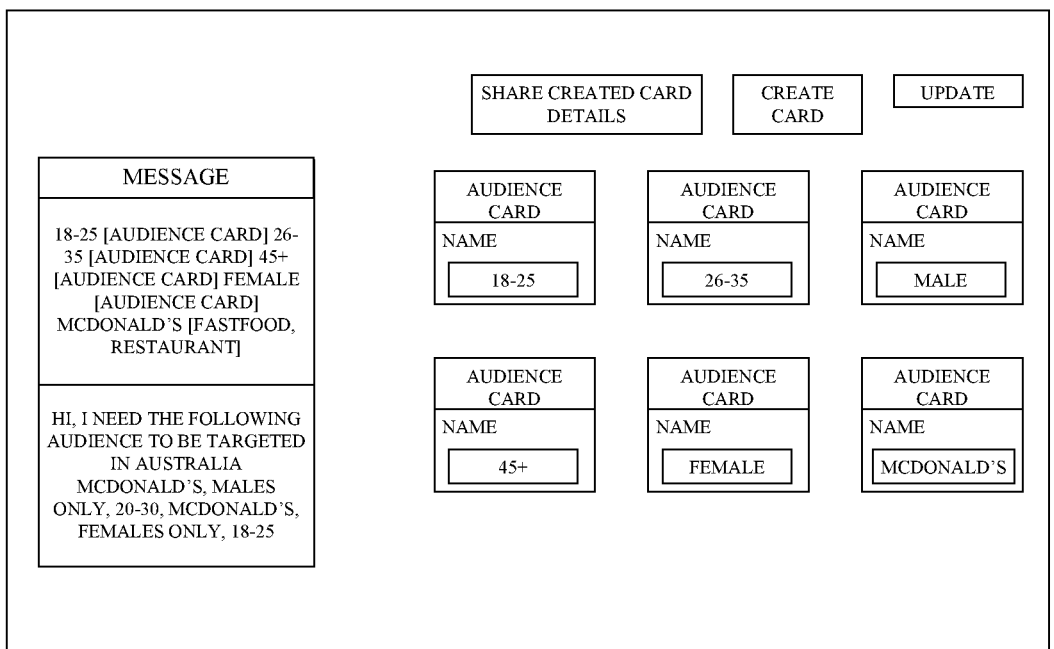

In FIG. 7D, 700D illustrates a user interface that includes a definition of the cohort generated based on the rule defining in real-time. In some embodiments, the definition of the cohort may be created manually as per requirements which is shown in 700E of FIG. 7E.

Figure 7F:
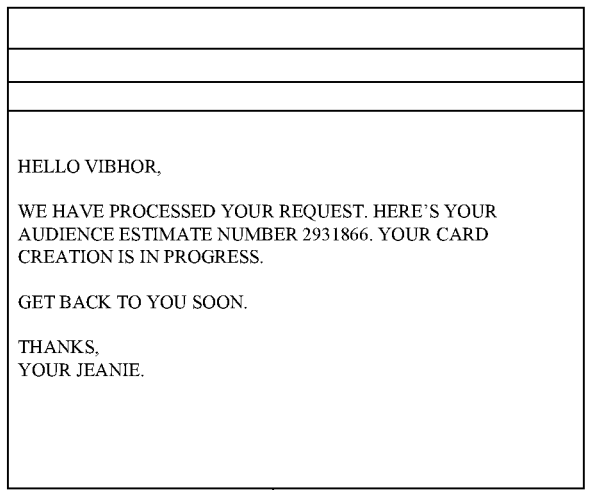

In FIG. 7F, 700F illustrates a communication through an e-mail to one or more entities 102A-N. In 700F, a message is shown as, "Your audience estimate number 2931866. Your card creation is in progress". The message specifies the estimate of size of the one or more target entities 110A-N. Also, indicates the definition of the cohort generation.

Figure 7G:
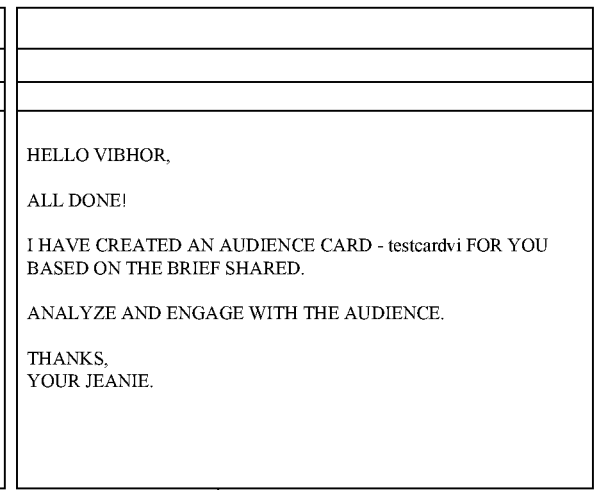

In FIG. 7G, 700G illustrates a communication through an e-mail to the one or more entities 102A-N by generating the definition of the cohort automatically based on the rule defining the cohort. In 700G, a message that indicates the definition of the cohort, "I have created an audience test card for you based on the brief shared".

Figure 8:
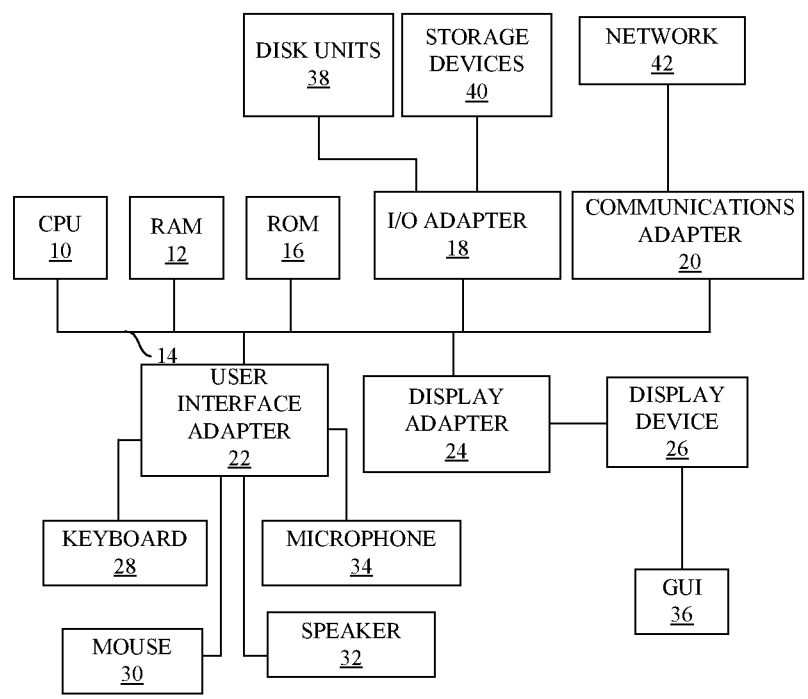
FIG. 8 is a schematic diagram of a computer architecture, in accordance with the embodiments herein.

A representative hardware environment for practicing the embodiments herein is depicted in FIG. 8, with reference to FIGS. 1 through 7. This schematic drawing illustrates a hardware configuration of a server/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes an entity interface adapter 22 that connects at least one of a keyboard 28, mouse 30, speaker 32, microphone 34, or other entity interface devices such as a touch screen device (not shown) to the bus 14 to gather entity input. Additionally, a communication adapter 20 connects the bus 14 to a data processing network 42, and a display adapter 24 connects the bus 14 to a display device 26, which provides a graphical entity interface (GUI) 36 of the output data in accordance with the embodiments herein, or which may be embodied as an output device such as a monitor, printer, or transmitter, for example.

The system and method impact overall process of management of marketing campaigns. The method automates the marketing brief response lifecycle by converting unstructured information to structured target information. The method handles a large number of concurrent requests in real time. The method improves overall brief throughput considerably. The method supports a fast iterative approach for executing marketing campaigns quickly. The method of invention is more computationally efficient when it comes to data that is contextually relevant for a short time period and even when it is partially observable.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for automatically parsing an unstructured conversation using natural language processing to determine target entities for an engagement activity, the method comprising:
   obtaining at least one unstructured conversation associated with an asset between a plurality of entities using a dialogue manager from at least one communication channels;
   parsing said at least one unstructured conversation associated with said asset using a natural language processing (NLP) model to obtain a target information associated with said asset;
   extracting at least one attribute of a plurality of target entities from said target information associated with said asset using a natural language understanding (NLU) model of domain of said at least one unstructured conversation;
   generating, using said at least one attribute of said plurality of target entities, a definition of a cohort and at least one criteria for curation of said cohort for said asset by converting said at least one unstructured conversation into a structured target information, wherein said definition of said cohort comprises said at least one attribute of said plurality of target entities; and
   determining, using a hypercube estimator, a size and characteristics of said plurality of target entities in said cohort using said definition of said cohort and said at least one criteria for said asset for an engagement activity by (i) identifying a dimensional factor for each of a plurality of spatiotemporal dimensions of said plurality of target entities by processing the at least one unique entity identifier and a timestamp data updated in a geolocation of a key value data structure, and (ii) determining said size of said plurality of target entities in said cohort based on said definition of said cohort, said dimensional factor and a base cardinality of each or combinations of said plurality of spatiotemporal dimensions.

2. The method of claim 1, wherein said method further comprises:
   testing, in real-time, said cohort by running a test engagement activity with at least one unique entity identifier associated with at least one target entity in said plurality of target entities; and
   refining, in real-time, said plurality of target entities of said cohort for said asset based on said test engagement activity and curating said plurality of target entities for said engagement activity based on cohort response from said test engagement activity.

3. The method of claim 1, wherein said at least one attribute of said plurality of target entities and said characteristics of said plurality of target entities of said cohort comprise at least one of a countable attribute, a categorical attribute, an ordinal attribute, a location, a spatial attribute, or a temporal behavior of the plurality of target entities, wherein said cohort comprises metadata of said cohort, wherein said metadata comprises data associated with said at least one of the categorical attribute, the spatial attribute, or the temporal behavior of the plurality of target entities.

4. The method of claim 3, wherein said countable attribute of said plurality of target entities comprises at least one of (i) spend levels, or (ii) a frequency of visits to a location, wherein said categorical attribute of said plurality of target entities comprises at least one of (i) a gender, (ii) an age-group, (iii) a content, or (iv) a content type, wherein said spatial attribute of said plurality of target entities comprises at least one of (i) residential areas, (ii) regions of interest, or (iii) place categories.

5. The method of claim 1, wherein said method further comprises training the natural language understanding (NLU) model using at least one of a definition of said cohort data associated with said asset, or a domain information associated with said asset.

6. The method of claim 1, wherein said method further comprises determining, using a target audience estimator, said size of said plurality of target entities in said cohort based on said definition of said cohort.

7. The method of claim 1, wherein said plurality of spatiotemporal dimensions comprises a location, individual attributes, a time window or activity or a combination thereof.

8. The method of claim 1, wherein said method further comprises automatically generating a response for said engagement activity based on said at least one unstructured conversation associated with said asset.

9. One or more non-transitory computer-readable storage medium storing the one or more sequence of instructions for automatically parsing an unstructured conversation using natural language processing to determine target entities for an engagement activity, which when executed by a processor cause:
   obtaining at least one conversation associated with an asset between a plurality of entities using a dialogue manager from at least one communication channels;
   parsing said at least one unstructured conversation associated with said asset using a natural language processing (NLP) model to obtain a target information associated with said asset;
   extracting at least one attribute of a plurality of target entities from said target information associated with said asset using a natural language understanding (NLU) model of domain of said at least one unstructured conversation;
   generating, using said at least one attribute of said plurality of target entities, a definition of a cohort and at least one criteria for curation of said cohort for said asset by converting said at least one unstructured conversation into a structured target information, wherein said definition of said cohort comprises said at least one attribute of said plurality of target entities; and
   determining, using a hypercube estimator, a size and characteristics of said plurality of target entities in said cohort using said definition of said cohort and said at least one criteria for said asset for an engagement activity by (i) identifying a dimensional factor for each of a plurality of spatiotemporal dimensions of said plurality of target entities by processing the at least one unique entity identifier and a timestamp data updated in a geolocation of a key value data structure, and (ii) determining said size of said plurality of target entities in said cohort based on said definition of said cohort, said dimensional factor and a base cardinality of each or combinations of said plurality of spatiotemporal dimensions.

10. A system for automatically parsing an unstructured conversation using natural language processing to determine target entities for an engagement activity, the system comprising:
a processor;
a memory that stores set of instructions, which when executed by the processor, causes to perform:
obtaining at least one unstructured conversation associated with an asset between a plurality of entities using a dialogue manager from at least one communication channels;
parsing said at least one unstructured conversation associated with said asset using a natural language processing (NLP) model to obtain a target information associated with said asset;
extracting at least one attribute of a plurality of target entities from said target information associated with said asset using a natural language understanding (NLU) model of domain of said at least one unstructured conversation;
generating, using said at least one attribute of said plurality of target entities, a definition of a cohort and at least one criteria for curation of said cohort for said asset by converting said at least one unstructured conversation into a structured target information, wherein said definition of said cohort comprises said at least one attribute of said plurality of target entities; and
determining, using a hypercube estimator, a size and characteristics of said plurality of target entities in said cohort using said definition of said cohort and said at least one criteria for said asset for an engagement activity by (i) identifying a dimensional factor for each of a plurality of spatiotemporal dimensions of said plurality of target entities by processing the at least one unique entity identifier and a timestamp data updated in a geolocation of a key value data structure, and (ii) determining said size of said plurality of target entities in said cohort based on said definition of said cohort, said dimensional factor and a base cardinality of each or combinations of said plurality of spatiotemporal dimensions.

11. The system of claim 10, wherein said processor further:
tests, in real-time, said cohort by running a test engagement activity with at least one unique entity identifier associated with at least one target entity in said plurality of target entities; and
refines, in real-time, said plurality of target entities of said cohort for said asset based on said test engagement activity and curating said plurality of target entities for said engagement activity based on cohort response from said test engagement activity.

12. The system of claim 10, wherein said at least one attribute of said plurality of target entities and said characteristics of said plurality of target entities of said cohort comprise at least one of a countable attribute, a categorical attribute, an ordinal attribute, a location, a spatial attribute, or a temporal behavior of an entity, wherein said cohort comprises metadata of said cohort, wherein said metadata comprises data associated with said at least one of the categorical attribute, the spatial attribute, or the temporal behavior of the plurality of target entities.

13. The system of claim 12, wherein said countable attribute of said plurality of target entities comprises at least one of (i) spend levels, or (ii) a frequency of visits to a location, wherein said categorical attribute of said plurality of target entities comprises at least one of (i) a gender, (ii) an age-group, (iii) a content, or (iv) a content type, wherein said spatial attribute of said plurality of target entities comprises at least one of (i) residential areas, (ii) regions of interest, or (iii) place categories.

14. The system of claim 10, wherein said processor further trains the natural language understanding (NLU) model using at least one of a definition of said cohort data associated with said asset, or a domain information associated with said asset.

15. The system of claim 10, wherein said processor further determines, using a target audience estimator, said size of said plurality of target entities in said cohort based on said definition of said cohort.

16. The system of claim 10, wherein said plurality of spatiotemporal dimensions comprises a location, individual attributes, a time window/activity, or a combination thereof.

17. The system of claim 10, wherein said processor further automatically generates a response for said engagement activity based on said at least one unstructured conversation associated with said asset.

* * * * *